Patented Jan. 21, 1941

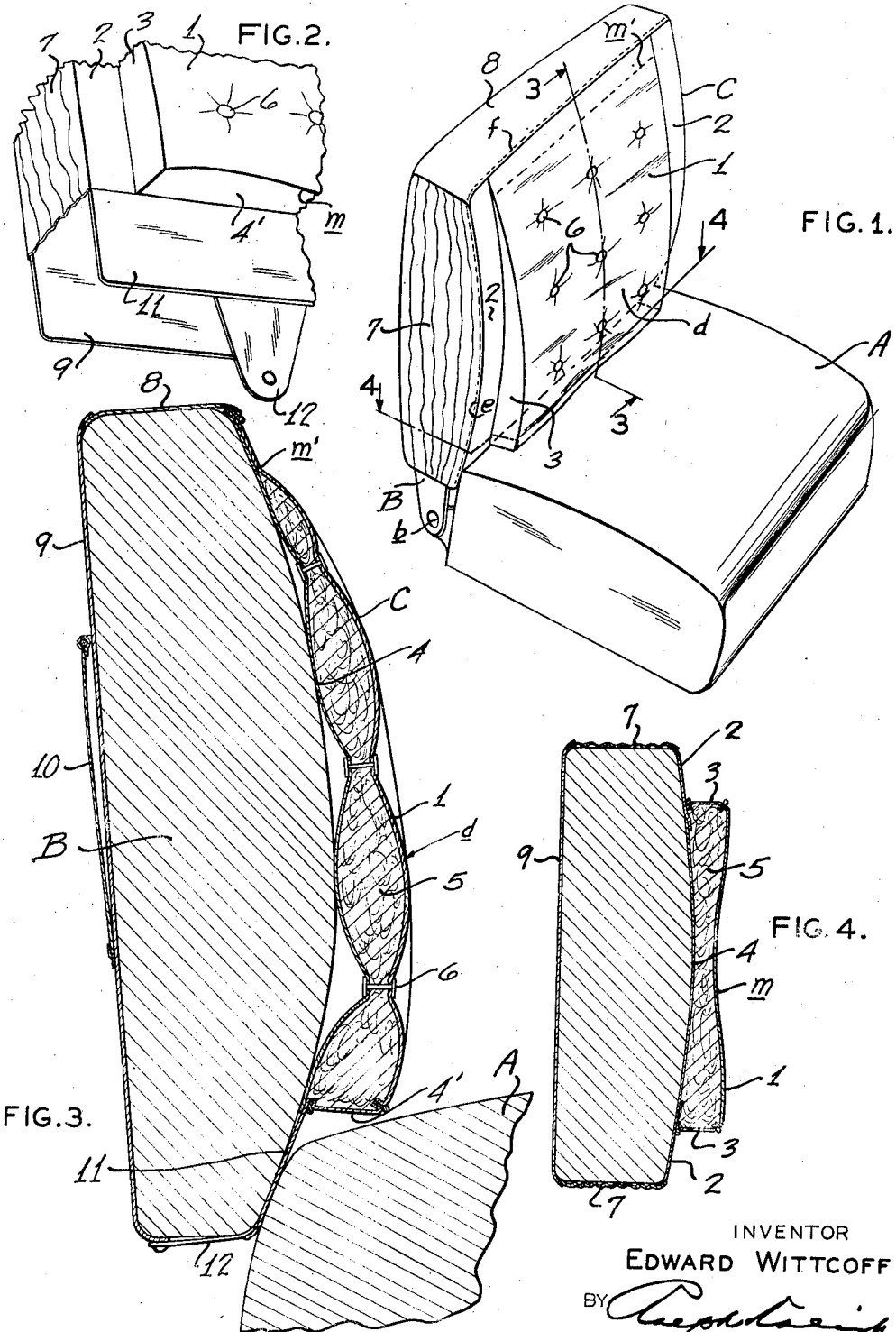

2,229,160

UNITED STATES PATENT OFFICE 2,229,160

COMBINED SEAT-BACK COVER AND CUSHION

Edward Wittcoff, University City, Mo.

Application March 10, 1939, Serial No. 260,886

2 Claims. (Cl. 155—182)

This invention relates generally to automobile seat-covers. More particularly, my invention relates to a certain new and useful improvement in combined seat-back covers and cushions and has for its primary object the provision, as an integral or unitary structure, of a combined cover and cushion for the back of the seat, which may be economically constructed, which may be very conveniently applied or installed to an automobile seat-back, which is unusually comfortable and conformable to the curvature of the back of the occupant of the seat, and which is highly efficient in the performance of its stated functions.

And with the above and other objects in view, my invention resides in the novel features of form, construction, arrangement, and combination of parts presently described and pointed out in the claims.

In the accompanying drawing—

Figure 1 is a perspective view of a combined seat-back cover and cushion embodying my present invention in installed position upon a seat-back;

Figure 2 is an enlarged fragmentary perspective view of a corner of the combined seat-back cover and cushion;

Figure 3 is a further enlarged sectional view of the combined seat-back cover and cushion, taken transversely of the seat-back approximately along the line 3—3, Figure 1; and Figure 4 is a fragmentary sectional view of the combined seat-back cover and cushion, taken longitudinally of the seat-back approximately along the line 4—4, Figure 1.

Referring now in more detail and by reference characters to the drawing, which illustrates a preferred embodiment of my invention, A designates a so-called driver's seat of the type commonly employed in sedans and other automobiles, forming part of which, and hingedly attached thereto, as at $b$, is a forwardly folding normally upright seat-back B.

C designates a combined seat-back cover and cushion of my invention, which is of corresponding dimensions for enveloping or enclosing disposition over and about the seat-back B, as shown and as more fully presently appears, and which includes a front wall $c$ of a size to extend over the front of the seat-back B and constructed preferably of any suitable woven fibrous material, such, for instance, as matting woven of straw or twisted paper strands, which is flexible and pliable for convenience and ease in installation and yet sufficiently rigid to efficiently resist wrinkling or distortion when in use and, in addition, possesses a degree of porosity for driver's comfort.

As best seen in Figure 1, the wall $c$ may be said to be divided into a central portion 1 and marginal wings 2, joined by intermediate right angularly disposed portions 3. Stitched or otherwise fixed to the wings 2 at or adjacent their inner margin and spanning or paralleling the front central portion 1, is a section 4 of cloth or other suitable fabric, and joining the wall 4 and front wall portion 1 at or adjacent their lower margins, is a so-called bottom wall 4' having its forwardly presented margin $m$ curved or concaved inwardly for purposes presently more fully appearing.

Disposed intermediate the front wall portions 1, 3, the cloth section 4, and bottom wall 4', is padding 5 preferably of loosely consolidated, air-pervious material, such as kapok, for instance, the latter being tacked or tufted, as at 6, the wall-portions 1, 3, and 4 and enclosed or housed padding 5 thus constituting or forming a driver's cushion, as at $d$, substantially integral with, or as a unit of, the seat-back cover. As best seen in, and with reference to, Figures 2 and 3, the intermediate front wall portions 3 taper in width toward the upper margin $m'$ of the front wall C, and consequently the cushion $d$ is of wedge-shape transversely of the cover C for both neatness of appearance and driver's comfort.

The front wall 1 of the cushion $d$ furthermore has a transverse concavity of increasing extent from its upper margin $m'$ to its lower margin $m$, thus providing more or less back-fitting, comfort-increasing contour, as best seen in Figure 4.

Stitched or otherwise fixed, as at $e$, to the outer margins of the wings 2, are side panels 7 preferably constructed of an elastic or other suitable fabric, and, as at $f$, stitched or otherwise fixed to and along the upper margin of the front wall portions 1 and 2, and seamed or otherwise joined at its transverse ends to the side panels 7, is a suitable top panel 8.

Marginally stitched or otherwise fixed to and along the outer margins of the side panels 7 and top panel 8, is a back panel 9 also formed of any suitable fabric material, preferably provided upon its outer and normally rearwardly presented face with an upwardly opening conventional pocket-forming flap 10.

Finally stitched or otherwise fixed to and along the lower margin of the front wall portions 1, 2, is an extension flap 11 preferably of suitable fabric material provided along its lower margin with a plurality of fastening tabs 12 adapted to be conventionally buttoned or snap-fastened to the lower portion of the back panel 9, as best seen in Figure 3, for removably securing the member C in full operative disposition upon the seat-back B.

In use, the member C may be quickly and conveniently slipped over the seat-back B in pillow-case fashion and drawn down into snug tight unwrinkled position, the extension flaps 11 being then projected between the seat A and back B and engaged with fastening tabs 12 for removably securing the member C and its cushion $d$ tightly in place.

The present cushion is not only simple and economical in construction, but is unusually flexible and embodies a number of unique comfort-providing features. By reason of the gradually increasing concavity or inwardly curved contour of the cushion-forming member $d$ and the relatively greater flexibility of the front wall portion 1, which is formed of interwoven fibrous material, as compared with the fabric back wall 4, the cushion will readily modify its curved contour to accommodate the variations in the back of various individuals who may from time to time use the seat. In addition, the cushion member $d$, having front, side, and bottom walls 1, 3, and 4' made of loosely woven fibrous material and being separated from a relatively closely woven fabric back wall 4 by a loosely consolidated air pervious tufted padding 5, will have a remarkable ventilating character which will keep the back of the driver cool and comfortable even in the warmest weather and, at the same time, will act as a sort of air cushion having marked shock-absorbing resiliency.

It will be evident that, by my invention, I thus provide a combined seat-back cover and cushion, thereby unitarily accomplishing the dual purpose of protecting the seat from dirt and dust and, at the same time, providing a comfortable, convenient back-accommodating cushion.

It should be understood that changes and modifications in the form, construction, arrangement, and combination of parts of the combined seat-back cover and cushion may be made and substituted for those herein shown and described without departing from the nature and principle of my invention.

Having thus described my invention, what I claim and desire to secure by Letters Patent is:

1. A seat cover comprising a fabric envelope having front and rear walls of substantially similar peripheral size and shape, said front wall having built therein a wedge-shaped cushion, a substantially non-stretchable top wall extending transversely between and marginally connecting the front and rear walls, and opposed parallel side walls formed of a stretchable material and extending connectively between the side margins of the front and rear walls respectively for drawing the front wall and cushion thereof into snug-fitting conformation with the front face of any seat-back upon which the seat cover is disposed.

2. A seat cover comprising a fabric envelope having front and rear walls connected in spaced relation along their upper margins, said front wall having built therein a wedge-shaped cushion, and opposed parallel side walls formed of a stretchable material and extending connectively between the side margins of the front and rear walls respectively for drawing the front wall and cushion thereof into snug-fitting conformation with the front face of any seat-back upon which the cover is disposed.

EDWARD WITTCOFF.